(12) United States Patent
Seo et al.

(10) Patent No.: US 7,813,848 B2
(45) Date of Patent: Oct. 12, 2010

(54) CONTROL SYSTEM FOR HYBRID VEHICLE

(75) Inventors: Nobuhide Seo, Fuchu-cho (JP); Kei Yonemori, Fuchu-cho (JP)

(73) Assignee: Mazda Motor Corporation (JP)

( * ) Notice: Subject to any disclaimer, the term of this patent is extended or adjusted under 35 U.S.C. 154(b) by 658 days.

(21) Appl. No.: 11/843,177

(22) Filed: Aug. 22, 2007

(65) Prior Publication Data

US 2008/0051949 A1    Feb. 28, 2008

(30) Foreign Application Priority Data

Aug. 25, 2006    (JP) .............................. 2006-229373

(51) Int. Cl.
*B60K 6/26*    (2007.10)
*B60K 6/46*    (2007.10)
(52) U.S. Cl. ............... 701/22; 180/65.245; 180/65.285; 903/906
(58) Field of Classification Search .................. 701/22; 180/65.285, 65.245; 903/906
See application file for complete search history.

(56) References Cited

U.S. PATENT DOCUMENTS

| 7,032,699 | B2 * | 4/2006 | Sakata et al. ................. 180/247 |
| 7,701,156 | B2 * | 4/2010 | Okamura ..................... 318/255 |
| 2003/0098185 | A1 | 5/2003 | Komeda et al. |

(Continued)

FOREIGN PATENT DOCUMENTS

EP    1 276 221    1/2003

(Continued)

OTHER PUBLICATIONS

European Search Report Application No. EP 07 016 473.6 dated Dec. 11, 2007.

*Primary Examiner*—Mark Hellner
*Assistant Examiner*—Ari M Diacou
(74) *Attorney, Agent, or Firm*—Studebaker & Brackett PC; Donald R. Studebaker (57) ABSTRACT

Disclosed is a hybrid vehicle control system, which comprises a current conversion device for changing an amplitude or a frequency of an alternating current generated by a generator, unit for determining a required output of a vehicle-driving motor in conformity to a required vehicle-driving force, unit for determining a current waveform to be supplied to the vehicle-driving motor, in conformity to the required output of the vehicle-driving motor, and controllably determine a strategy of how to supply an AC electric power, and a bypass line adapted to bypass the current conversion device. When there is a waveform difference between a current waveform required for the vehicle-driving motor and a current waveform output from the generator, an AC electric power is supply to the vehicle-driving motor after eliminating the waveform difference through the current conversion device. When there is no waveform difference between the current waveforms, an AC electric power is supplied directly to the vehicle-driving motor via the bypass line. The hybrid vehicle control system of the present invention makes it possible to supply an AC electric power to the vehicle-driving motor via the bypass line when there is no waveform difference, without AC-to-DC-to-AC conversion and the mediation of the current conversion device, so as to achieve enhanced fuel economy and reduced electric power consumption of the current conversion device while ensuring a desired current conversion through the current conversion device when there is a waveform difference.

4 Claims, 6 Drawing Sheets

U.S. PATENT DOCUMENTS

| | | | |
|---|---|---|---|
| 2004/0040759 A1* | 3/2004 | Shimizu et al. | 180/65.2 |
| 2004/0163860 A1* | 8/2004 | Matsuzaki et al. | 180/65.2 |
| 2006/0201730 A1* | 9/2006 | Kaneko et al. | 180/243 |
| 2007/0233332 A1* | 10/2007 | Kawada et al. | 701/13 |
| 2009/0159348 A1* | 6/2009 | Oyobe et al. | 180/65.21 |

FOREIGN PATENT DOCUMENTS

| | | |
|---|---|---|
| GB | 2 069 260 | 8/1981 |
| JP | 2005-318731 | 11/2005 |
| WO | 2005/105511 A1 | 11/2005 |

* cited by examiner

CONTROL SYSTEM FOR HYBRID VEHICLE

BACKGROUND OF THE INVENTION

1. Field of the Invention

The present invention relates to a hybrid vehicle control system, and more particularly to a hybrid vehicle control system comprising a current conversion device adapted to change an amplitude or a frequency of an alternating current generated by a generator.

2. Background Art

Heretofore, there has been known a hybrid vehicle equipped with a combination of a plurality of drive power sources and designed to be driven by operating the drive power sources simultaneously or individually depending on the situation. As a drive power source, the conventional hybrid vehicle is typically equipped with an internal combustion engine (hereinafter referred to simply as "engine") and an electric power generator (hereinafter referred to simply as "generator"). In hybrid vehicles, a drive train configured to drive road wheels (i.e., driving wheels) only by a vehicle-driving motor is referred to as "series hybrid configuration", and a drive train configured to selectively switch between a driving force mechanically transmitted from an engine and a driving force from a vehicle-driving motor so as to drive road wheels by a selected one of the driving forces is referred to as "parallel hybrid configuration".

In either configuration, an electric power generated by the generator is once stored in a battery. Then, when the vehicle-driving motor is operated, the stored electric power is discharged from the battery and supplied to the vehicle-driving motor.

The above operation of charging and discharging an electric power into/from the battery has to be performed under mediation of an inverter for converting between a direct-current (DC) electric power and an alternating-current (AC) electric power, because the generator is designed to generate an electric power in the form of an AC electric power, whereas the charging/discharging of the battery are allowed only in the form of a DC electric power. During this operation, the presence of the inverter is likely to cause electric power loss, which leads to deterioration in fuel economy.

From this point of view, there has been developed a control system designed to supply an AC electric power from a generator to a vehicle-driving motor (AC motor) while maintaining a fundamental shape of the AC electric power, i.e., without AC-to-DC-to-AC conversion. The control system includes one type which comprises a current conversion device adapted to change an amplitude or a frequency of an alternating current generated by a generator.

The current conversion device can convert a waveform (amplitude, frequency and phase) of an alternating current generated by a generator, to a current waveform required for a vehicle-driving motor, without AC-to-DC-to-AC conversion, and supply the converted alternating current to the vehicle-driving motor. Thus, as compared with a control system designed to once convert an AC electric power to a DC electric power through an inverter or the like, the control system using the current conversion device can achieve higher efficiency, i.e., can facilitate improvement in fuel economy.

As one specific example, JP 2005-318731A discloses a vehicle power supply system comprising a current conversion device called "matrix converter". This matrix converter is designed to convert an m-phase alternating current generated by a generator, to an m-phase alternating current having a current waveform required for a vehicle-driving motor. For this purpose, the matrix converter is provided with m×m bidirectional switches (e.g., if m=3, nine bidirectional switches).

However, for operating the matrix converter, it is essentially required to supply an electric power from a battery to the respective bidirectional switches. In view of promoting further improvement in fuel economy, there remains the need for minimizing electric power consumption of the matrix converter (current conversion device).

SUMMARY OF THE INVENTION

It is an object of the present invention to provide a hybrid vehicle control system meeting the above need.

In order to achieve this object, the present invention provides a control system for a hybrid vehicle which includes a generator adapted to be driven by an internal combustion engine and a vehicle-driving motor adapted to drive road wheels, and has a specific electric-power supply mode for supplying an alternating current generated by the generator, to the vehicle-driving motor without AC-to-DC-to-AC conversion. The control system comprises: a current conversion device interposed in a current-conversion-device line electrically connecting the generator and the vehicle-driving motor, and adapted to be operated based on an electric power supplied from a battery so as to change an amplitude or a frequency of an alternating current generated by the generator; required motor output determination means adapted to determine a required output of the vehicle-driving motor in conformity to a required vehicle-driving force; electric-power supply control means adapted to determine a current waveform of an AC electric power to be supplied to the vehicle-driving motor, in conformity to the required output of the vehicle-driving motor, and controllably determine a strategy of how to supply the AC electric power; and a bypass line adapted to electrically connect the generator and the vehicle-driving motor in such a manner as to bypass the current conversion device. In this control system, the electric-power supply control means is operable, when there is a substantial waveform difference between a current waveform required for the vehicle-driving motor and a current waveform output from the generator, in the specific electric-power supply mode, to supply an AC electric power from the generator to the vehicle-driving motor via the current-conversion-device line so as to eliminate the waveform difference through the current conversion device. Further, the electric-power supply control means is operable, when there is no substantial waveform difference between the current waveforms and thereby an equilibrium waveform conversion is performed in the current conversion device, in the specific electric-power supply mode, to supply an AC electric power from the generator to the vehicle-driving motor via the bypass line without mediation of the current conversion device.

The above and other objects, features and advantages of the invention will become more apparent upon reading the following detailed description along with the accompanying drawings.

DESCRIPTION OF THE PREFERRED EMBODIMENTS

Figure 1:
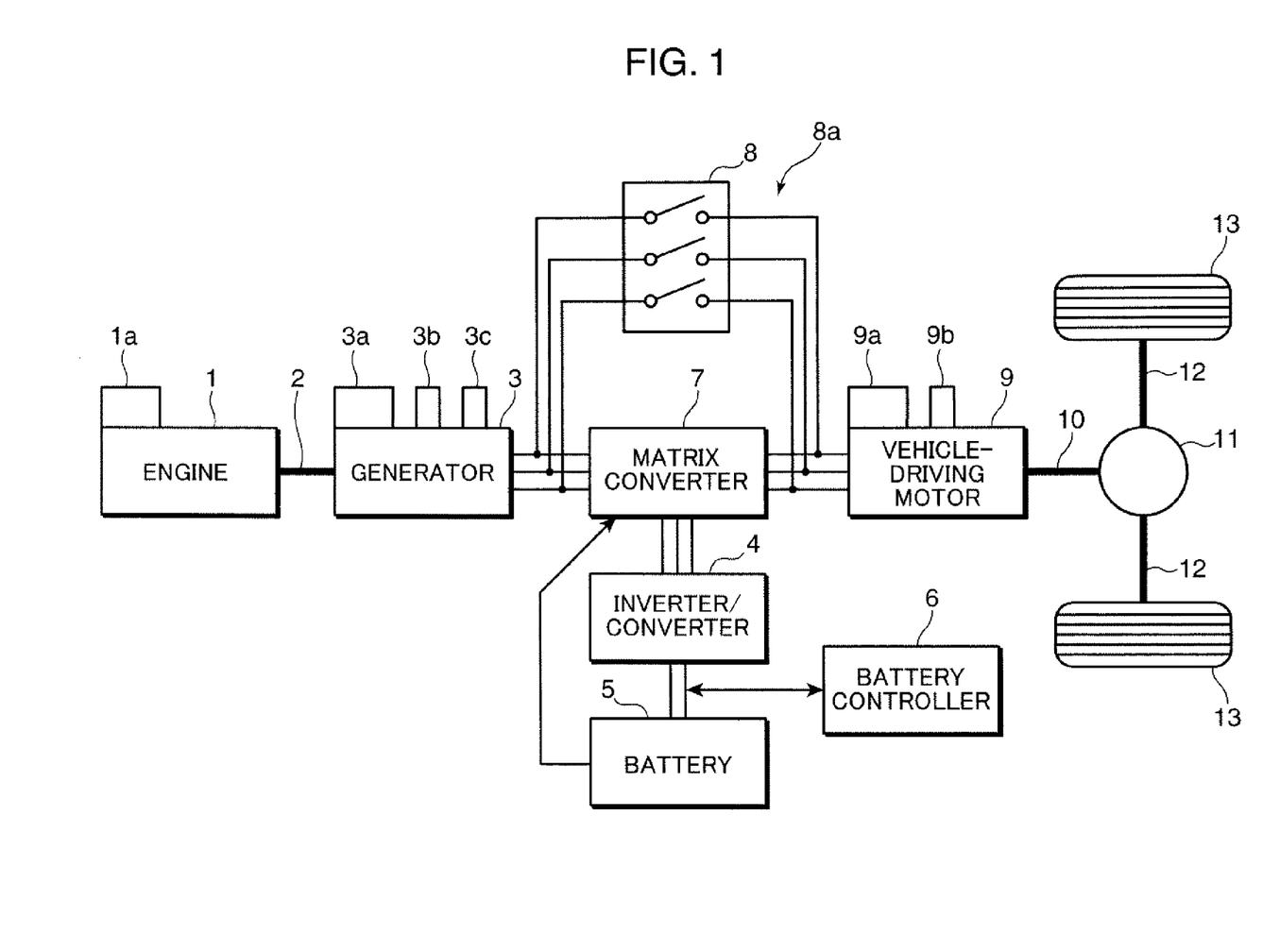
FIG. 1 is a block diagram showing a schematic configuration of a hybrid vehicle incorporating a control system according to one embodiment of the present invention.

With reference to the drawings, an embodiment of the present invention will now be described. FIG. 1 is a block diagram showing a schematic configuration of a hybrid vehicle incorporating a control system according to one embodiment of the present invention. The hybrid vehicle comprises an engine 1 which has a throttle valve 1a adapted to controllably reduce an intake air amount so as to serve as a means to adjust an engine output. The engine 1 has a crankshaft 2 as an output shaft which is mechanically connected to an electric power generator 3. The generator 3 is adapted to be driven by the engine output received from the crank shaft 2 so as to generate a three-phase (u-phase, v-phase and w-phase) alternating current. The generator 3 is provided with a generator torque controller 3a for adjusting an amount of electric power to be generated (or engine torque to be absorbed), a generator rotation angle sensor 3b for detecting a rotation angle of a rotor (not shown) as an input shaft thereof, and a generator current sensor 3c for detecting an amplitude (equivalent to magnitude) of an generated alternating current.

The generator 3 has an output terminal electrically connected to a matrix converter 7 (serving as a current conversion device). The matrix converter 7 is a conventional type adapted to change an amplitude or frequency of a three-phase alternating current generated by the generator 3 so as to convert the original three-phase alternating current to a three-phase alternating current having a waveform different from that of the original three-phase alternating current. The matrix converter 7 internally has nine (=3 phases×3 phases) switching elements adapted to be repeatedly turned on/off so as to perform a current-waveform conversion operation. An electric power required for driving the switching elements is supplied from a battery 5 to the matrix converter 7.

Specifically, the battery 5 is electrically connected to the matrix converter 7 through an inverter/converter 4. The inverter/converter 4 is a conversion device serving as both an inverter with a function of conversion between DC electric power and AC electric power and a converter with a function of frequency/voltage conversion.

The hybrid vehicle includes a battery controller 6 adapted to monitor an amount of electric power stored (i.e., storage amount) in the battery 5 and control charging/discharging of the battery 5 (i.e., charging/discharging of an electric power into/from the battery 5). In an operation of charging the battery 5, a part or entirety of an AC electric power generated by the generator 3 is lead to the inverter/converter 4 through the matrix converter 7. The AC electric power is converted to a DC electric power having a specified voltage through the inverter/converter 4, and then introduced into the battery 5. In an operation of discharging the battery, the stored DC electric power is converted to an AC electric power having an optimal alternating current waveform through the inverter/converter 4, and then the AC electric power is supplied to the vehicle-driving motor 9 through the matrix converter 7.

The vehicle-driving motor 9 is an AC motor adapted to convert a supplied AC electric energy to a rotational energy of an after-mentioned rotor and output the rotational energy to a motor output shaft 10. The vehicle-driving motor 9 is provided with a motor torque controller 9a for controlling a waveform (amplitude, frequency, phase) of a current to be supplied to the vehicle-driving motor 9, and a motor rotation angle sensor 9b for detecting a rotation angle of a rotor 91 (see FIG. 3) of the vehicle-driving motor 9. The motor torque controller 9a also serves as phase-angle setting means operable to set a current phase angle θ of the vehicle-driving motor 9, as described in detail later.

The motor output shaft 10 is mechanically connected to a drive axle 12 and two road wheels 13 through a differential unit (including reduction gear unit).

The matrix converter 7 is interposed in an electric-power supply line electrically connecting the generator 3 and the vehicle-driving motor 9 (hereinafter referred to as "matrix-converter line (current-conversion-device line)". Further, a bypass line 8a is electrically connected to the matrix-converter line in such a manner as to bypass the matrix converter 7, and a switch 8 is inserted in the bypass passage 8a to selectively open and close the bypass passage 8a.

In this embodiment, as a mode of supplying an electric power to the vehicle-driving motor 9, the hybrid vehicle has a first electric-power supply mode and a second electric-power supply mode which are selectively switched therebetween depending on vehicle driving conditions. The first electric-power supply mode is configured to supply an alternating current generated by the generator 3 to the vehicle-driving motor 9 without AC-to-DC-to-AC conversion. The first electric-power supply mode is selected when a required output of the vehicle-driving motor 9 is in a predetermined medium-to-high output range (hereinafter referred to as "first driving range").

A current supply line in the first electric-power supply mode includes the matrix-converter line extending from the generator 3 to the vehicle-driving motor 9 through the matrix converter 7, and the bypass line 8a adapted to bypass the matrix converter 7. The matrix-converter line is selected when there is a substantial waveform difference (i.e., difference in amplitude, frequency and/or phase) between a current waveform required for the vehicle-driving motor 9 and a current waveform output from the generator 3, so as to eliminate the waveform difference through the matrix converter 7. The bypass line 8a is selected when there is no substantial difference between the two current waveforms.

The second electric-power supply mode is configured such that, after converting an AC electric power from the generator 3, to a DC electric power through the inverter/converter 4, and storing the DC electric power in the battery 5, the DC electric power is discharged from the battery 5 and converted to an AC electric power through the inverter/converter 4, and the AC electric power is supplied to the vehicle-driving motor 9 through the matrix converter 7 (i.e., the same mode as that in a conventional electric vehicle). The second electric-power supply mode is selected when the required output of the vehicle-driving motor 9 is in a low output range (hereinafter referred to as "second driving range") relative to the first driving range.

Figure 2:
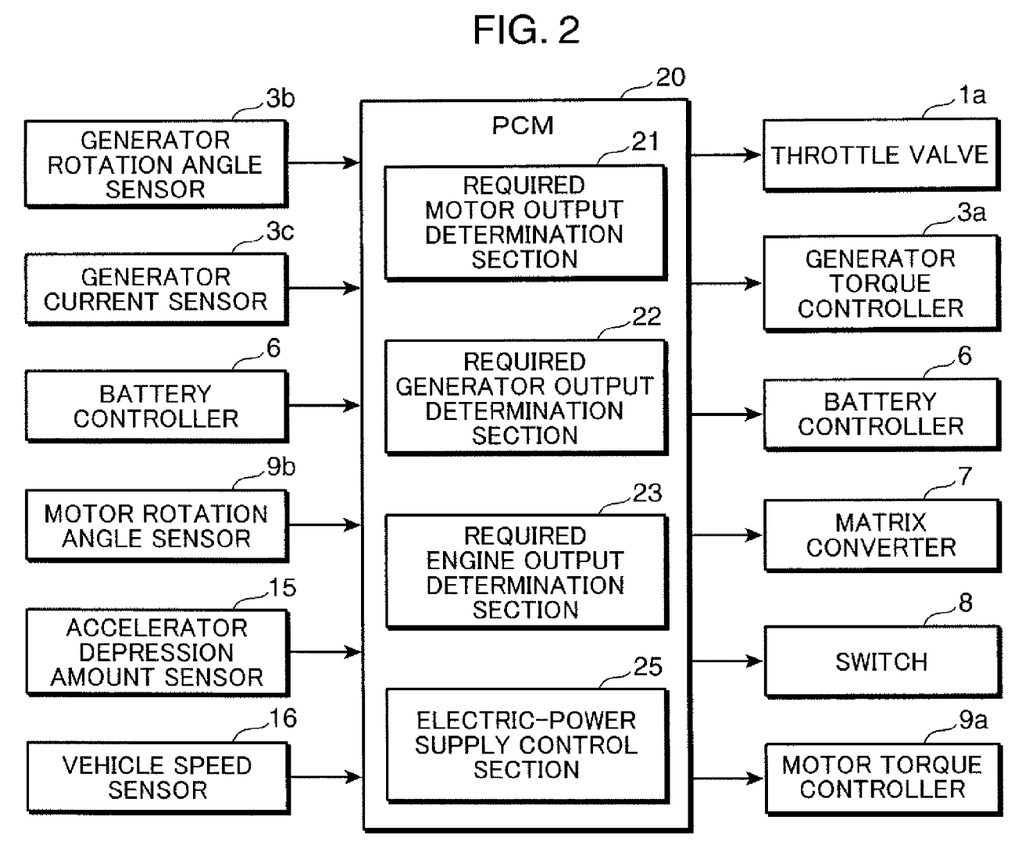
FIG. 2 is a schematic block diagram showing the control system of the hybrid vehicle.

FIG. 2 is a schematic block diagram showing the control system of the hybrid vehicle. A powertrain control module (PCM) 20 as a processing unit has an input terminal electrically connected with the generator rotation angle sensor 3b, the generator current sensor 3c, the battery controller 6 (which inputs a storage amount signal), the motor rotation angle sensor 9b, an accelerator depression amount sensor 15 for detecting an amount of accelerator depression by a driver, and a vehicle speed sensor 16 for detecting a vehicle speed. The PCM 20 has an output terminal connected to the throttle valve 1a (specifically, an actuator for opening and closing the throttle valve 1a) of the engine 1, the generator torque controller 3a, the battery controller 6 (to which a charging/discharging command signal is output), the matrix converter 7, the switch 8 and the motor torque controller 9a.

The PCM 20 is composed of a computer comprising a CPU, a ROM and a RAM. Specifically, the CPU is operable to perform a given processing with reference to input information from the above input elements and according to a program pre-stored in the ROM (or the RAM), and output a processing result as a driving signal to each of the above output elements.

As shown in FIG. 2, the PCM 20 functionally comprises a required motor output determination section 21, a required generator output determination section 22, a required engine output determination section 23 and an electric-power supply control section 25.

The required motor output determination section 21 (serving as required motor output determination means) is adapted to determine a required output (including a required torque) of the vehicle-driving motor 9 in conformity to a required vehicle driving force. The required vehicle driving force is determined based on the amount of driver's accelerator depression (including a change rate thereof) detected by and input from the accelerator depression amount sensor 15 and the vehicle speed detected by and input from the vehicle speed sensor 16. For example, the required vehicle driving force may be determined by reading out a value from an experimentally-obtained and pre-stored correlation map of a required vehicle driving force and an accelerator depression amount/vehicle speed, with reference to the input accelerator depression amount and vehicle speed.

The required generator output determination section 22 (serving as required generator output determination means) is adapted to determine a required output of the generator 3. Particularly in the first electric-power supply mode, a required output (AC electric power) of the generator 3 is determined to have a current waveform conforming to that of a current required for the vehicle-driving motor 9 to obtain a required motor output.

The required engine output determination section 23 (required engine output determination means) is adapted to determine a required output (torque, rotation speed) of the engine 1 in conformity to the required output of the generator 3. The rotation speed of the engine 1 has a proportional relation to a frequency of an AC electric power generated by the generator 3. Thus, particularly in the first electric-power supply mode, the rotation speed of the engine 1 (engine speed) is determined to have a value corresponding to the frequency of the required generator output.

The electric-power supply control section 25 (serving as electric-power supply control means) is adapted to determine a current waveform of an AC electric power to be supplied to the vehicle-driving motor 9, in conformity to a required output of the vehicle-driving motor 9, and controllably determine a strategy of how to supply the AC electric power. Specifically, the electric-power supply control section 25 is operable, when the required output of the vehicle-driving motor 9 is in the first driving range, to supply the AC electric power in the first electric-power supply mode, and, when the required output of the vehicle-driving motor 9 is in the second driving range, to supply the AC electric power in the second electric-power supply mode. Further, in the first electric-power supply mode, the electric-power supply control section 25 is operable, when there is a substantial waveform difference between a current waveform required for the vehicle-driving motor 9 and a current waveform output from the generator 3, to select the matrix-converter line, and, when there is no substantial waveform difference between the two current waveforms, to select the bypass line 8a.

Figure 3:
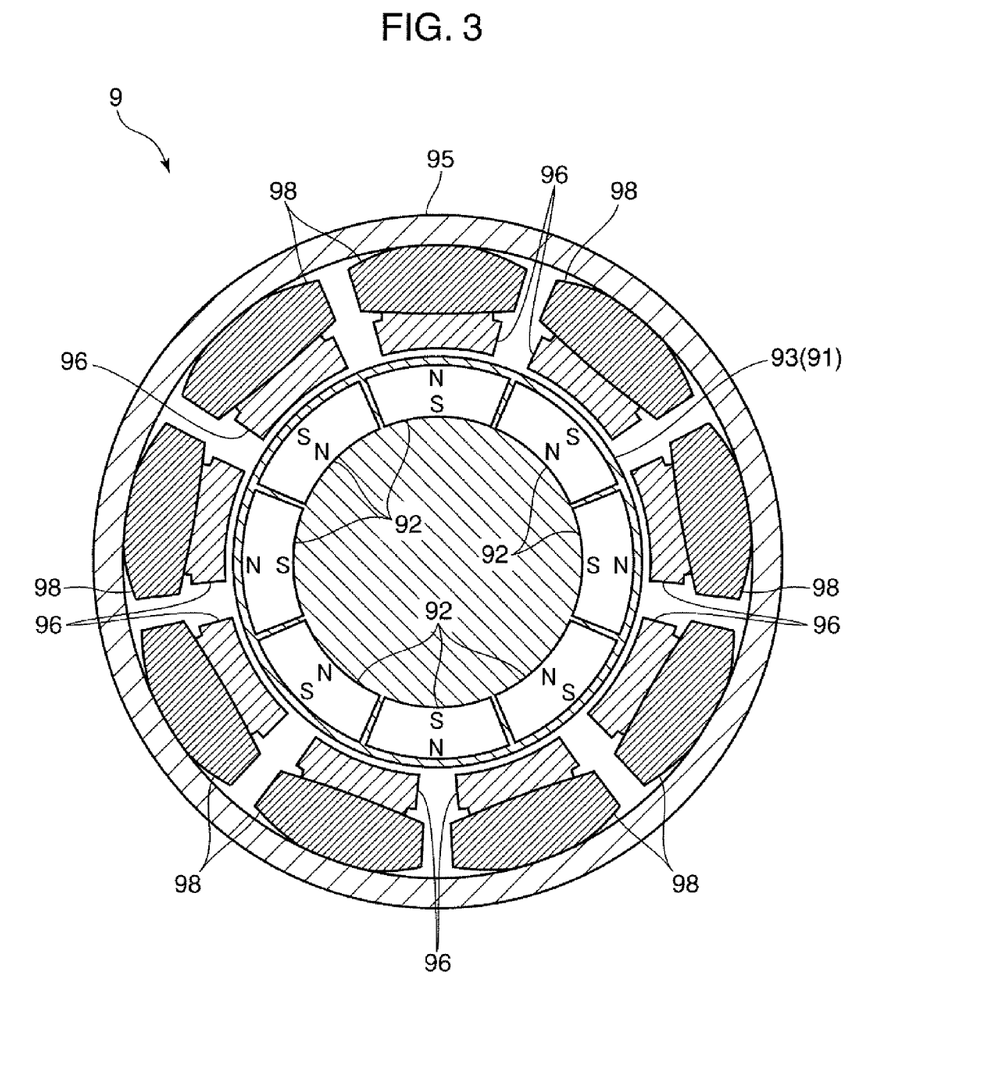
FIG. 3 is a cross-sectional view showing a vehicle-driving motor in the hybrid vehicle.

FIG. 3 is a cross-sectional view showing the vehicle-driving motor 9, taken along a plane perpendicular to an axis thereof. With reference to FIG. 3, the structure of the vehicle-driving motor 9 will be specifically described below. The vehicle-driving motor 9 is one type of AC motor generally called "interior permanent magnet (IPM) synchronous motor".

The vehicle-driving motor 9 comprises an approximately cylindrical-shaped case 95, and nine stators 96 each extending from an inner peripheral surface of the case 95 toward an axis of the vehicle-driving motor 9 (i.e., a center of the motor output shaft 10). Each of the stators 96 has a coil 98 wound therearound thereon in a concentric pattern.

The vehicle-driving motor 9 further includes a rotor 91 disposed concentrically with the case 95 and rotatably together with the motor output shaft 10. The rotor 91 is formed in an approximately columnar-shape, and a small gap is defined between an outer peripheral surface of the rotor 91 and respective distal ends of the stators 96. The rotor 91 comprises a major component consisting of an approximately columnar-shaped core 93, and eight permanent magnets 92 embedded in a portion of the rotor 91 adjacent to the outer peripheral surface thereof. Each of the permanent magnets 92 has opposite magnetic poles arranged in a radial direction of the case 95, and respective opposite magnetic poles of adjacent two of the permanent magnets 92 are reversely arranged.

Upon supplying a current to flow through the coil 98, the stator 96 becomes an electromagnet. Specifically, the distal ends of the stators 96 are magnetized with N or S pole. If respective ones of the stators 96 and the permanent magnets 92 have opposite magnetic poles when they are in opposed relation to each other, an attractive force will be exerted therebetween. Conversely, if they have the same magnetic poles, a repulsive force will be exerted therebetween. An alternating current is supplied to each of the coils 98, and therefore the distal end of the stator 96 is alternately magnetized with N and S poles, and a magnetic intensity of the stator 96 is changed every second. According to changes in magnetic field formed by the stators 96 and coils 98, the rotor 91 is rotated in a direction for increasing the attractive force and reducing the repulsive force. A torque arising from the attractive/repulsive forces between the electromagnets on the side of the stator 96 and the permanent magnets on the side of the rotor 91 is referred to particularly as "magnet torque".

As a feature of the IPM synchronous motor, in addition to the magnet torque, a torque called "reluctance torque" is generated in the rotor 91. The reluctance torque arises from an attractive force which is exerted on the core 93 of the rotor 91 by the electromagnets on the side of the stator 96. A plurality of portions of the core 93 located between the adjacent permanent magnets 92 (i.e., remaining portions of the core 93 after the permanent magnets are removed therefrom) are disposed to extend radially in cross-section, so that an intensity of attractive force acting on the radially-extending portions of the core 93 is changed depending on a rotation angle of the rotor 91. Thus, a value of reluctance torque is changed depending on changes in the magnetic field to be formed by the stator 96 and the coil 98 and in the rotation angle of the rotor 91.

Although not specifically illustrated, the generator 3 has fundamentally the same structure as that of the vehicle-driving motor 9. In the structure of the generator 3, the rotor 91 is integrally rotated together with the crankshaft 2 to generate a three-phase induced current in the coils 98.

Figure 4:
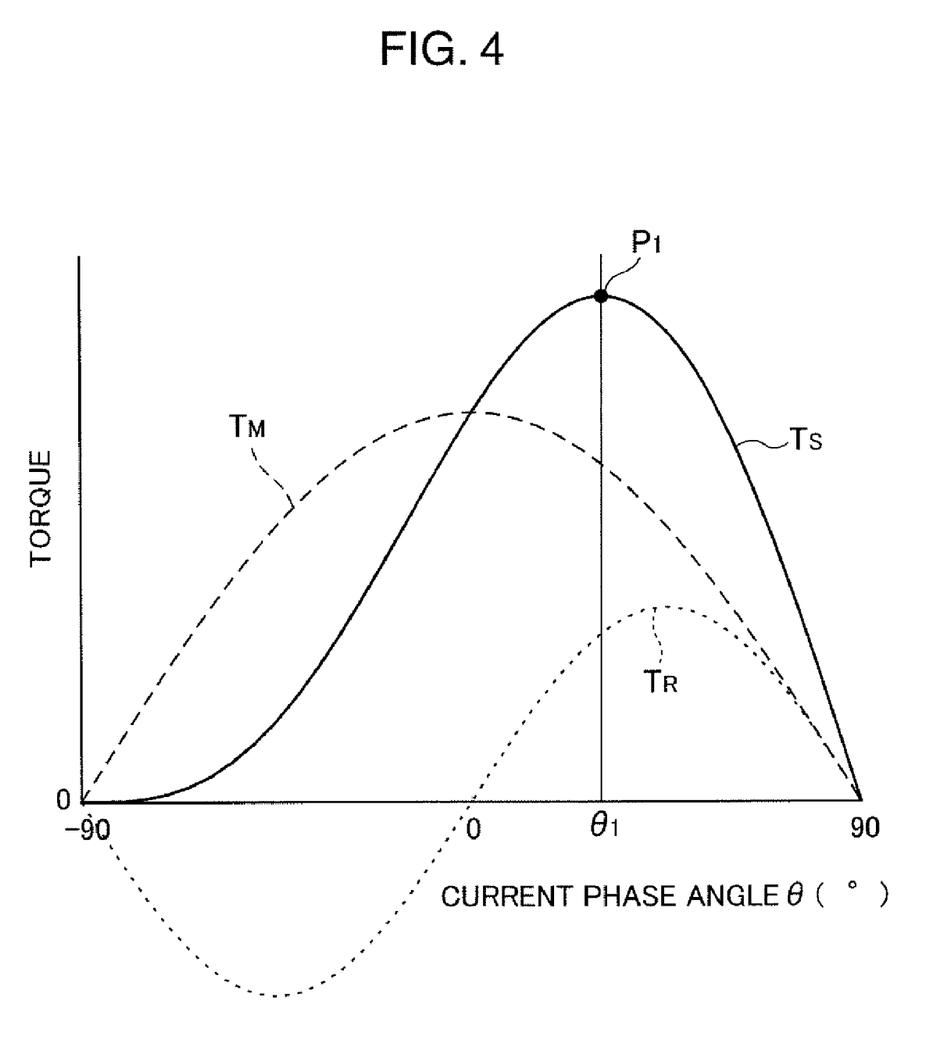
FIG. 4 is a graph showing characteristic curves of torque to be generated by the vehicle-driving motor.

FIG. 4 is a graph showing characteristic curves of torque to be generated by the vehicle-driving motor 9, wherein the horizontal axis represents a current phase angle θ (°), and the vertical axis represents a torque value. The current phase angle θ means a value indicative of a relative angular difference between a phase of a current supplied to the coils 98 and the rotation angle of the rotor 91. The motor torque controller 9a is operable to set the current phase angle θ at a predetermined value. In FIG. 4, a magnet torque TM and a reluctance torque TR at a certain current value are indicated by the broken line and the dotted line, respectively. Further, a motor torque TS which is a sum (total torque) of the magnet torque TM and the reluctance torque TR is indicated by the solid line.

As shown in FIG. 4, the magnet torque TM has a maximum value when the current phase angle $\theta=\theta_0$ (=0°), and a minimum value (=zero) when the current phase angle θ=−90° or 90°. The reluctance torque TR has a maximum value when the current phase angle θ=45°, and a minimum value (negative value) when the current phase angle θ=−45°. The reluctance torque TR becomes zero when the current phase angle θ=−90°, 0° or 90°. The motor torque TS, i.e., the sum of the magnet torque TM and the reluctance torque TR, has a maximum value (point $P_1$) when the current phase angle $\theta=\theta_1$ (0°<$\theta_1$<45°), and becomes zero when the current phase angle θ=−90° or 90°. This current phase angle $\theta_1$ is also referred to as "optimal current phase angle".

The motor torque controller 9a is operable to adjust the current phase angle θ to be the optimal current phase angle $\theta_1$. The characteristic of the motor torque TS is changed depending on a magnitude (amplitude) of the current, and the optimal current phase angle $\theta_1$ will be changed accordingly. Thus, for example, after pre-storing mapped data of a current amplitude and a corresponding optimal current phase angle $\theta_1$, in the PCM 20, the optimal current phase angle $\theta_1$ may be determined by reading out a value from the mapped data, with reference to an actual current amplitude detected by and received from the generator current sensor 3c.

An operation of the hybrid vehicle will be described below. In the first driving range where an output required for the vehicle (road wheels 13) is in the predetermined medium-to-high output range, the engine 1 is operated, and an engine output is input into the generator 3 through the crankshaft 2. Thus, the generator 3 generates a three-phase alternating current (AC electric power) based on a mechanical rotational energy input from the crankshaft 2.

The required generator output determination section 22 sets the three-phase alternating current to have a current waveform conforming to a current waveform required for the vehicle-driving motor 9 to obtain a required motor output corresponding to a required vehicle-driving force. Further, the required engine output determination section 23 sets a required output (torque, rotation speed) of the engine 1 in conformity to the required output of the generator 3.

If the engine 1 and the generator 3 accurately operate according to the above settings, a current waveform output from the generator 3 will conform to a current waveform required for the vehicle-driving motor 9 without a substantial waveform difference therebetween. In reality, a substantial waveform difference is likely to cause due to a response delay in control in a transient driving condition.

When there is a substantial waveform difference between the required current waveform of the vehicle-driving motor 9 and the output current waveform of the generator 3, the electric-power supply control section 25 operates to turn off the switch 8 and activate the matrix converter 7 so as to supply an alternating current from the generator 3 to the vehicle-driving motor 9 through the matrix converter 7 (i.e., via the matrix converter line). In the matrix converter 7, the switching elements are turned on/off to convert the alternating current to have an amplitude, a frequency and a phase conforming to the required current waveform of the vehicle-driving motor 9.

If there is no substantial waveform difference, the electric-power supply control section 25 operates to turn on the switch 8 and deactivate the matrix converter 7 so as to supply an alternating current from the generator 3 to the vehicle-driving motor 9 via the bypass line 8a.

Figure 5:
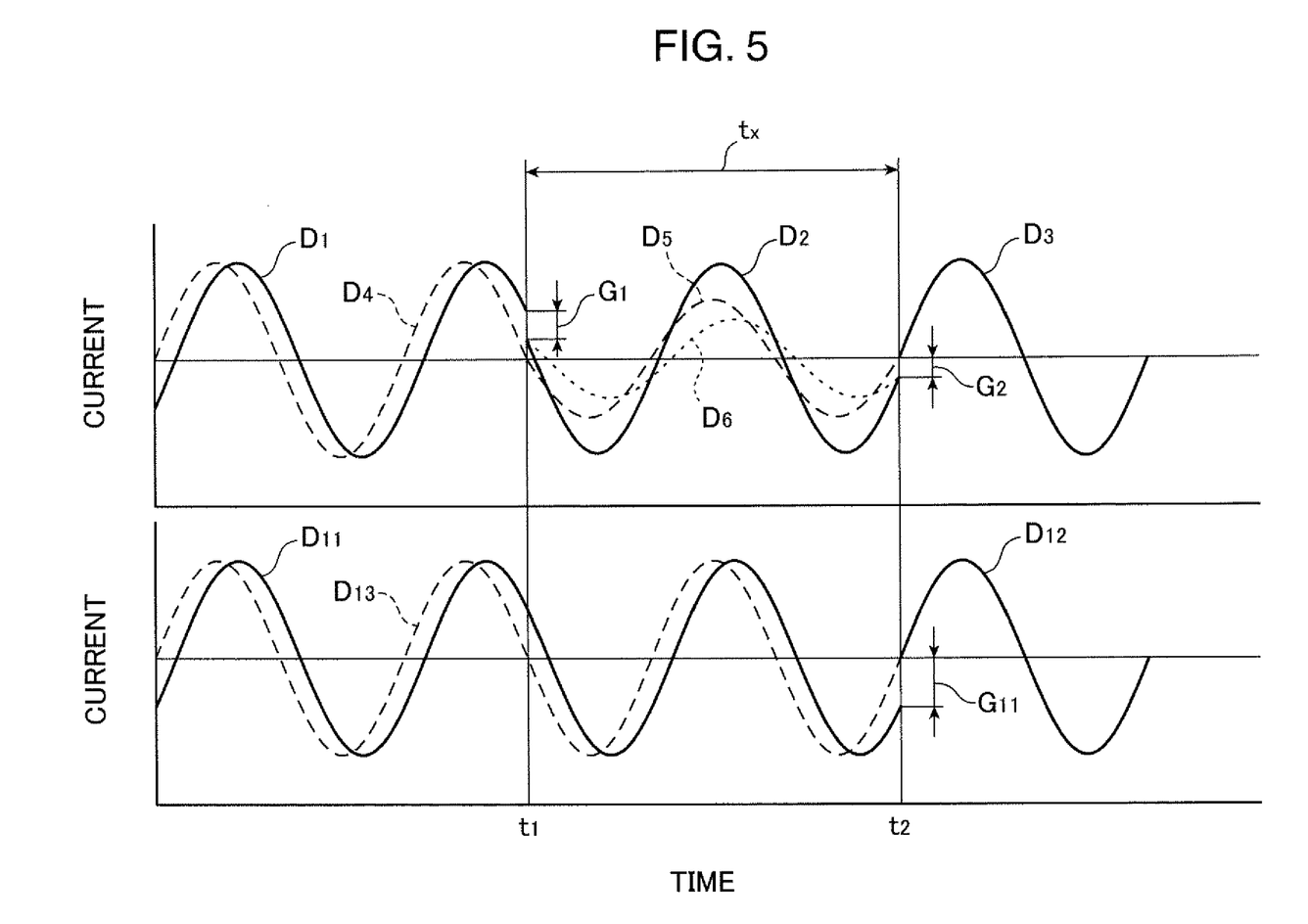
FIG. 5 is a time chart showing a current waveform during an operation of switching from a current-conversion-device line to a bypass line.

With reference to FIG. 5, an operation of switching from the matrix-converter line to the bypass line 8a will be described below. FIG. 5 is a time chart showing a current waveform during the operation of switching from the matrix-converter line to the bypass line 8a, wherein the horizontal axis represents a time, and the vertical axis represents a current amplitude. An upper chart shows characteristic curves in a switching operation with a transitional time period tx, and a lower chart shows characteristics in a switching operation without the transitional time period tx.

The characteristic curves during the switching operation without the transitional time period tx illustrated in the lower chart of FIG. 5 will be first described. In this example, the matrix-converter line is switched to the bypass line 8a at Time $t_2$. In this lower chart, the solid line indicates a post-conversion current $D_{11}$, which is an alternating current to be supplied to the vehicle-driving motor 9 via the matrix-converter line (i.e., just after passing through the matrix converter 7), and a bypass current $D_{12}$ which is an alternating current to be supplied to the vehicle-driving motor 9 via the bypass line 8a (i.e., without mediation of the matrix converter 7). Further, the broken line indicates a generator output current $D_{13}$ which is an alternating current just after being output from the generator 3.

The post-conversion current $D_{11}$ before Time $t_2$ has a current waveform conforming to a required current waveform of the vehicle-driving motor 9. In this example, given that, before Time $t_2$, the matrix converter performs an equilibrium waveform conversion. As used in this specification, the term "equilibrium waveform conversion" means a state when the matrix converter 7 outputs a current waveform substantially identical to that of an alternating current input thereinto from the generator 3, to the vehicle-driving motor 9 without performing any substantial conversion operation therein. In the lower chart, the generator output current $D_{13}$ is formed as the post-conversion current $D_{11}$ through the equilibrium waveform conversion. Although the post-conversion current $D_{11}$ is likely to have a slight phase lag relative to the generator output current $D_{13}$, such a phase lag is not included in the "substantial waveform difference".

That is, at Time $t_2$, there is no substantial waveform difference between a required current waveform of the vehicle-driving motor 9 (equivalent to the post-conversion current $D_{11}$) and the current waveform of the generator output current $D_{13}$. Thus, a line switching operation is performed at Time $t_2$. Consequently, the bypass current $D_{12}$ will be supplied to the vehicle-driving motor 9. The bypass current $D_{12}$ corresponds to the generator output current $D_{13}$ lead to the vehicle-driving motor 9 via the bypass line 8a, i.e., is identical to the generator output current $D_{13}$ (in the lower chart, the bypass current $D_{12}$ is accurately superimposed on the generator output current $D_{13}$).

As shown in the lower chart, the Time $t_2$ (switching timing) is preferably set around a zero-cross point where a current value (current amplitude) of the post-conversion current $D_{11}$ or the generator output current $D_{13}$ becomes approximately zero. This makes it possible to protect the switch 8. Specifically, if the line switching operation is performed when a relatively large current flows, an increased load on the switch 8 is likely to cause damage in the switch 8. In contrast, the line switching operation performed around the zero-cross point can eliminate the risk.

In addition, the Time $t_2$ set around the zero-cross point allows the line switching operation to be smoothly performed. As illustrated in the lower chart, at the switching timing, the current curves have a discontinuous portion (current gap $G_{11}$) due to the time lag of the generator output current $D_{13}$ relative to the post-conversion current $D_{11}$. The line switching operation performed around the zero-cross point can reduce an influence of the current gap to suppress the occurrence of torque shock due to variation in output torque.

In view of further reducing the torque shock, it is preferable to minimize the current gap $G_{11}$. For the purpose of effectively reducing the current gap $G_{11}$, a transitional time period tx is provided as indicated by the characteristic curves in the upper chart.

As seen in the characteristic curves of the upper chart, instead of performing the line switching operation at Time $t_2$, i.e., momentarily, the line switching operation is performed in a stepwise manner in the transitional time period tx (between Time $t_1$ and Time $t_2$). Specifically, in the transitional time period tx, the switch 8 is turned on while maintaining the operation of the matrix converter 7. That is, an alternating current is supplied to the vehicle-driving motor 9 via both the matrix-converter line and the bypass line 7.

In the upper chart, the solid line indicates a post-conversion current $D_1$ which is an alternating current to be supplied to the vehicle-driving motor 9 via the matrix-converter line (i.e., just after passing through the matrix converter 7), a total current $D_2$ which is a total alternating current to be supplied to the vehicle-driving motor 9 in the transitional time period tx, and a bypass current $D_3$ which is an alternating current to be supplied to the vehicle-driving motor 9 via the bypass line 8a (i.e., without mediation of the matrix converter 7). Further, the broken line indicates a generator output current $D_4$ which is an alternating current just after being output from the generator 3. The dotted line indicates a transitional bypass current $D_5$ which is an alternating current to be supplied to the vehicle-driving motor 9 via the bypass line 8a in the transitional time period tx, and a transitional post-conversion current $D_6$ which is an alternating current to be supplied to the vehicle-driving motor 9 via the matrix-converter line in the transitional time period tx.

The total current $D_2$ is a sum of the transitional bypass current $D_5$ and the transitional post-conversion current $D_6$. In this example of the upper chart, a ratio of (transitional bypass current $D_5$):(transitional post-conversion current $D_6$) is set to be about 6:4. This ratio may be appropriately determined.

In this example, given that, before Time $t_1$, the matrix converter 7 performs an equilibrium waveform conversion, as with the characteristic curves in the lower chart. The post-conversion current $D_1$ has a slight time lag relative to the generator output current $D_4$. Thus, when a part of an alternating current is switched from the matrix-converter line to the bypass line 8a at Time $t_1$, a current gap $G_1$ occurs due to the time lag. However, this current gap is smaller than the current gap $G_{11}$ in the characteristic curves of the lower chart, because only a part of the alternating current is switched to the bypass line 8a.

Further, when the remaining alternating current is also switched from the matrix-converter line to the bypass line 8a at Time $t_2$, a current gap $G_2$ occurs. This current gap is also smaller than the current gap $G_{11}$ in the characteristic curves of the lower chart, because only a part of the alternating current is switched to the bypass line 8a.

Thus, the relatively large current gap ($G_{11}$) is divided into the relatively small current gaps ($G_1$ and $G_2$) by performing the line switching operation in a stepwise manner. This makes it possible to reduce a current gap per time so as to further smoothly perform the line switching operation while effectively preventing the occurrence of large torque shock.

As described above, an alternating current is supplied to the vehicle-driving motor 9 via the matrix-converter line or the bypass line 8a. Then, a current phase angle θ of the alternating current supplied to vehicle-driving motor 9 is adjusted to be the optimal current phase angle $θ_1$ by the motor torque controller 9a. Further, the rotor 91 is rotated by a motor torque TS (sum of a magnet torque TM and a reluctance torque by the action of the alternating current flowing through the coil 98 and the rotor 91 with the core 93 having the permanent magnets 92 embedded therein.

The driving force obtained by the rotor 91 is output from the motor output shaft 10, and input into the differential unit 11. The differential unit 11 reduces a rotation speed from the motor output shaft 10, and outputs the torque to each of the right and left drive axles 12 while distributing the torque at a certain ratio depending on a difference in rotation speed between the drive axles 12. The road wheels 13 are rotationally driven by the torque received by the drive axles 12 to drive the vehicle.

The above description has been made about an operation in the first electric-power supply mode in the first driving range. In the first electric-power supply mode, an alternating current generated by the generator 3 can be supplied in a current waveform conforming to a required current waveform of the vehicle-driving motor 9 without AC-to-DC-to-AC conversion irrespective of a line for supplying the alternating current to the vehicle-driving motor 9. Thus, as compared with the control system designed to once convert an AC electric power to a DC electric power through the inverter/converter 4, this control system can achieve higher efficiency, i.e., can facilitate improvement in fuel economy.

In addition, a required current conversion based on the matrix converter is performed only when there is a substantial waveform difference, while allowing an unnecessary current conversion (equilibrium waveform conversion) to be omitted when there is no substantial waveform difference. This makes it possible to suppress wasting of electric power so as to reduce electric power consumption of the matrix converter 7 as a whole.

According to the required generator output determination section 22 and the required engine output determination section 23, an output alternating current of the generator 3 is fundamentally set to have no waveform difference, so that the frequency of use of the bypass line 8a can be increased. That is, the electric power consumption of the matrix converter 7 can be more reduced.

An operation in the second electric-power supply mode to be selected in the low output range (second driving range) where an output required for the vehicle (road wheels 13) is less than that in the first driving range will be described below.

In the second electric-power supply mode, an electric power is supplied only from the battery 5 to the vehicle-driving motor 9. Specifically, an electric power stored in the battery 5 is discharged and supplied to the vehicle-driving motor 9 through the inverter/converter 4 and the matrix converter 7 (in the same manner as that in a conventional electric vehicle).

The second electric-power supply mode can be selected in the low output range, i.e., the second driving range, to eliminate the need for operating the engine 1 at a low output so as to effectively avoid deterioration in combustion efficiency due to the low output operation of the engine 1 to achieve enhanced fuel economy.

Figure 6:
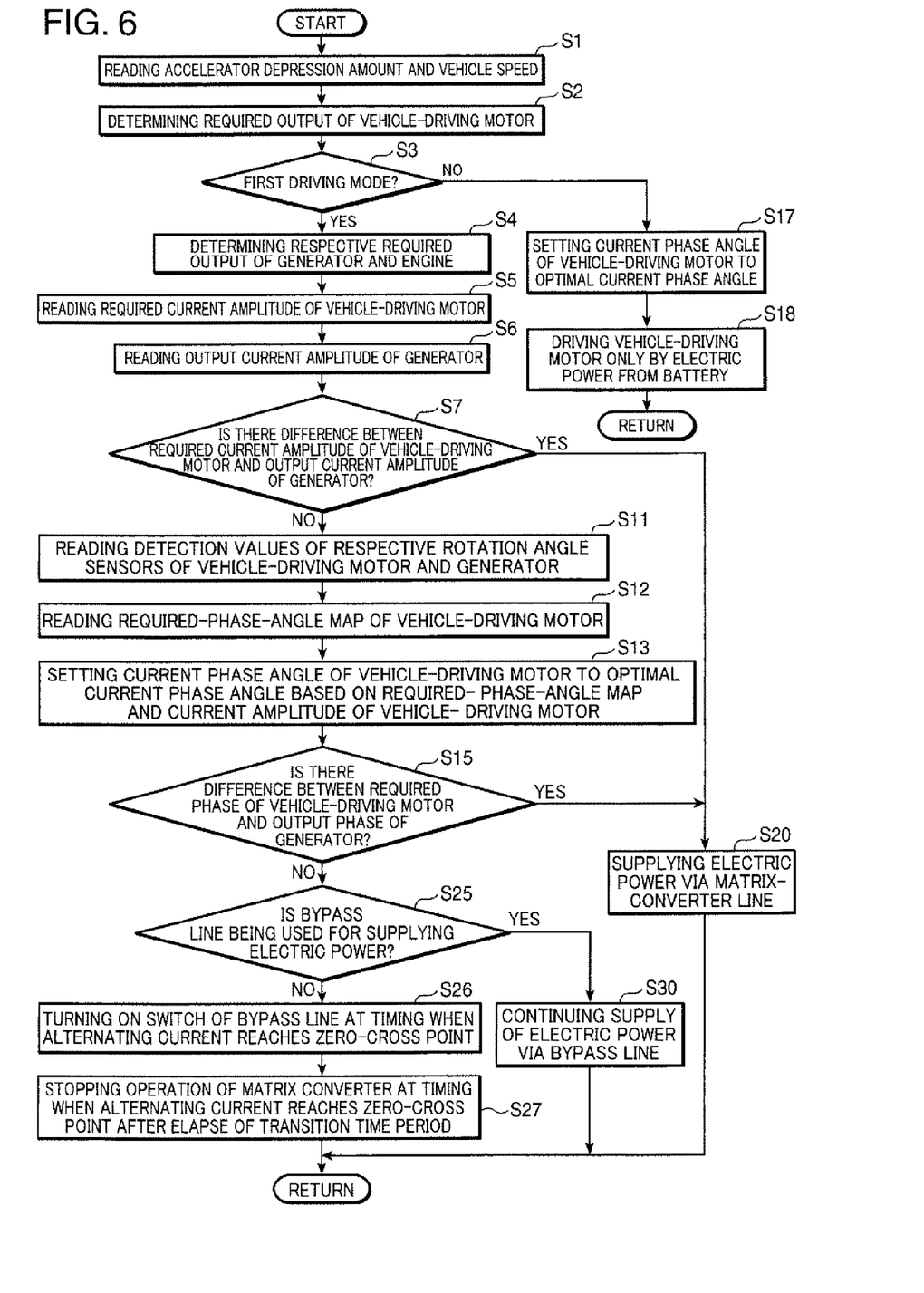
FIG. 6 is a schematic flowchart showing a control process including an electric-power supply line switching operation.

FIG. 6 is a schematic flowchart showing a control process including the current supply line switching operation. Upon starting this processing routine, an accelerator depression amount detected by the accelerator depression amount sensor 15 and a vehicle speed detected by the vehicle speed sensor 16 are read to calculate a required vehicle driving force (Step S1). Then, the required motor output determination section 21 determines the required vehicle driving force based on the accelerator depression amount and the vehicle speed, and determines a required output, i.e., required torque, of the vehicle-driving motor 9 in conformity to the required vehicle driving force (Step S2).

Then, based on the required output of the vehicle-driving motor 9, it is determined whether an actual driving condition falls within the first driving range (Step S3). If the determination in Step S3 is YES, or the actual driving condition falls within the first driving range, the processing routine advances to Step S4, and a processing for the first electric-energy supply mode will be performed.

In Step S4, the required generator output determination section 22 determines a required output of the generator 3 in conformity to the required output of the vehicle-driving motor 9, and the required engine output determination section 23 determines a required output of the engine 1 in conformity to the required output of the generator 3. Further, based on the determined values, the throttle valve 1a of the engine 1 is adjusted, and an electric energy amount to be generated by the generator 3 is adjusted by the generator torque controller 3a.

Then, a required current amplitude of the vehicle-driving motor 9 is read from the required output of the vehicle-driving motor 9 (Step S5). Further, an amplitude of an output current of the generator 3 is read from a detection value of the generator current sensor 3c (Step S6). Then, it is determined whether there is a difference between the required current amplitude of the vehicle-driving motor 9 and the output current amplitude of the generator 3 (Step S7).

If the determination in Step S7 is YES, the switch 8 is turned off, and the matrix converter 7 is activated, so that an alternating current output from the generator 3 is supplied to the matrix-converter line to allow a current waveform thereof to conform to a required current waveform of the vehicle-driving motor 9 through the matrix converter 7, and then supplied to the vehicle-driving motor 9 (Step S20).

If the determination in Step S7 is NO, a detection value of the motor rotation angle sensor 9b and a detection value of the generator rotation angle sensor 3b are read (Step S11). Then, a map of a required phase angle of the vehicle-driving motor 9 is read from pre-stored data (Step S13). Based on the current amplitude of the vehicle-driving motor 9 and the required-phase-angle map, a current phase angle $\theta$ of the vehicle-driving motor 9 is set at the optimal current phase angle $\theta_1$ (Step S13).

Then, it is determined whether there is a substantial phase difference (including a frequency difference) between a required phase of the vehicle-driving motor 9 and an output phase of the generator 3 (Step S15).

If the determination in Step 15 is YES, the processing routine advances to Step S20 to perform the same processing as that to be performed when the determination in Step 7 is YES, i.e., when there is an amplitude difference.

The determination "NO" in Step 15 means that the output current waveform of the generator 3 conforms to the required current waveform of the vehicle-driving motor 9. Thus, if the determination in Step 15 is NO, it is determined whether an alternating current is being supplied via the bypass line 8a (Step S25). If the determination in Step S25 is YES, the supply of the alternating current via the bypass line 8a will be continued (Step S30).

If the determination in Step S25 is NO, an operation of switching from the matrix-converter line to the bypass line 8a is performed in a stepwise manner. Specifically, at a timing (Time $t_1$ in FIG. 5) when an alternating current reaches a zero-cross point, the switch 8 is turned on while maintaining the operation of the matrix converter 7 (Step S26). Thus, a part of the alternating current is supplied to the vehicle-driving motor 9 via the bypass line 8a. Then, at a timing when the alternating current reaches a zero-cross point after an elapse of the transitional time period starting from Time $t_1$, the operation of the matrix converter 7 is stopped (Step S27). Thus, the entire alternating current is supplied via the bypass line 8a, and the line switching operation is completed.

If the determination in Step S3 is NO, i.e., the actual driving condition falls within the low output range (second driving range), an operation for the second electric-power supply mode will be performed. Specifically, a current phase angle $\theta$ of the vehicle-driving motor 9 is set at the optimal current phase angle $\theta_1$ (Step S17: equivalent to Steps S11 to A13). Then, the vehicle-driving motor 9 is driven only by an electric power from the battery 5 (Step S18), and the processing routine returns to a normal engine control routine.

As above, the present invention has been described based on a specific embodiment thereof. It is understood that various modifications and changes may be made therein without departing from the spirit and scope of the present invention. For example, while a matrix converter is used as a current conversion device in the above embodiment, the current conversion device for used in the present invention is not limited to the matrix converter, but any other suitable type may be used.

The control system according to the above embodiment is designed to fundamentally eliminate a waveform difference between a required current waveform of the vehicle-driving motor 9 and an output current waveform of the generator, based on the required generator output determination section 22 and the required engine output determination section 23. While the present invention is not limited to such a scheme, this scheme has an advantage of being able to increase the frequency of use of the bypass line 8a so as to further reduce electric power consumption of the matrix converter 7 (current conversion device).

The control system according to the above embodiment is designed to perform the operation of switching from the matrix-converter line to the bypass line 8a in a two-stage manner using the transitional time period. The line switching operation may be performed in three stages or more, or may be performed in a gradual/continuous manner using a variable resistor or the like. While the control system according to the above embodiment employs an IPM synchronous motor as the vehicle-driving motor 9, the use of the IPM synchronous motor is not essential to the present invention, and any other suitable type of vehicle-driving motor may be used.

As mentioned above in detail, the present invention provides a control system for a hybrid vehicle which includes a generator adapted to be driven by an internal combustion engine and a vehicle-driving motor adapted to drive road wheels, and has a specific electric-power supply mode for supplying an alternating current generated by the generator, to the vehicle-driving motor without AC-to-DC-to-AC conversion. The control system comprises: a current conversion device interposed in a current-conversion-device line electrically connecting the generator and the vehicle-driving motor, and adapted to be operated based on an electric power supplied from a battery so as to change an amplitude or a frequency of an alternating current generated by the generator; required motor output determination means adapted to determine a required output of the vehicle-driving motor in conformity to a required vehicle-driving force; electric-power supply control means adapted to determine a current waveform of an AC electric power to be supplied to the vehicle-driving motor, in conformity to the required output of the vehicle-driving motor, and controllably determine a strategy of how to supply the AC electric power; and a bypass line adapted to electrically connect the generator and the vehicle-driving motor in such a manner as to bypass the current conversion device. In this control system, the electric-power supply control means is operable, when there is a substantial waveform difference between a current waveform required for the vehicle-driving motor and a current waveform output from the generator, in the specific electric-power supply mode, to supply an AC electric power from the generator to the vehicle-driving motor via the current-conversion-device line so as to eliminate the waveform difference through the current conversion device. Further, the electric-power supply control means is operable, when there is no substantial waveform difference between the current waveforms and thereby an equilibrium waveform conversion is performed in the current conversion device, in the specific electric-power supply mode, to supply an AC electric power from the generator to the vehicle-driving motor via the bypass line without mediation of the current conversion device.

The above hybrid vehicle control system of the present invention makes it possible to supply an alternating current generated by the generator to the vehicle-driving motor without mediation of the current conversion device so as to provide enhanced fuel economy, and minimize a current conversion operation in the current conversion device so as to effectively reduce electric power consumption of the current conversion device, as described in detail below.

In the hybrid vehicle control system, when there is a substantial waveform difference between a current waveform required for the vehicle-driving motor and a current waveform output from the generator, an electric power is supplied to the vehicle-driving motor after eliminating the waveform difference through the current conversion device. This allows the vehicle-driving motor to output a desired vehicle-driving force.

When there is no substantial waveform difference between the two current waveforms, an electric power is supplied from the generator to the vehicle-driving motor via the bypass line. In this case, the electric power output from the generator is supplied to the vehicle-driving motor in a current waveform conforming to a required current waveform of the vehicle-driving motor without any conversion operation for the current waveform of the output electric power. This also allows the vehicle-driving motor to output a desired vehicle-driving force.

In either case, a current waveform conforming to a required current waveform of the vehicle-driving motor can be supplied to the vehicle-driving motor without AC-to-DC-to-AC conversion. Thus, as compared with the control system designed to once convert an AC electric power to a DC electric power through an inverter or the like, the hybrid vehicle control system of the present invention can achieve higher efficiency, i.e., can facilitate improvement in fuel economy.

In the above specific electronic-power supply mode, a conventional hybrid vehicle control system is designed to constantly supply an electric power to the vehicle-driving motor through the current conversion device (via the current-conversion-device line). That is, when there is no substantial waveform difference, an equilibrium waveform conversion is performed. Although this strategy has no problem about functionality, the battery is obliged to consume its electric power uselessly for the equilibrium waveform conversion in the current conversion device. In contrast, the hybrid vehicle control system of the present invention can eliminate unnecessary current conversion (equilibrium waveform conversion) while performing a required current conversion using the current conversion device, so as to suppress wasting of electric power to reduce electric power consumption of the current conversion device as a whole.

The hybrid vehicle control system of the present invention may further include required generator output determination means adapted to determine a required output of the generator in conformity to the required output of the vehicle-driving motor, and required engine output determination means adapted to determine a required output of the engine in conformity to the required output of the generator.

In this hybrid vehicle control system, in the specific electric-power supply mode, respective required outputs of the generator and the engine can be determined in conformity to the required output of the vehicle-driving motor. Thus, the generator can more easily output a current waveform conforming to a required current waveform of the vehicle-driving motor (the occurrence of a waveform difference is suppressed). This makes it possible to increase the frequency of use of the bypass line so as to further suppress the unnecessary electric power consumption.

In the hybrid vehicle control system of the present invention, the electric-power supply control means may be operable to switch from the current-conversion-device line to the bypass line, at a predetermined switching timing around a zero-cross point of a current waveform output from the generator or the current converter device.

This hybrid vehicle control system makes it possible to reliably protect a switching mechanism (switch or the like) for switching between the current-conversion-device line and the bypass line. Specifically, if the line switching operation is performed when a relatively large current flows, an increased load on the switching mechanism is likely to cause damage in the switching mechanism. In contrast, the line switching operation performed around the zero-cross point (relatively low current) can eliminate the risk.

In addition, the above hybrid vehicle control system allows the line switching operation to be smoothly performed. As mentioned above, a current waveform after the equilibrium waveform conversion through the current conversion device is likely to have a slight time lag relative to a current waveform output from the generator. If the line switching operation is performed in this state, a current gap occurs due to the time lag. The line switching operation performed around the zero-cross point can reduce an influence of the current gap to suppress the occurrence of torque shock due to variation in output torque.

In the hybrid vehicle control system of the present inventions the electric-power supply control means may be operable to switch from the current-conversion-device line to the bypass line, after an elapse of a predetermined transitional time period during which the AC electric power is supplied via both the current-conversion-device line and the bypass line.

This hybrid vehicle control system allows the line switching operation to be further smoothly performed. Specifically, under the condition that the current gap occurs during the line switching operation, if the operation is momentarily performed, the current is rapidly changed along the current gap to increase the risk of occurrence of torque shock. In the above hybrid vehicle control system, the transitional time period during which the AC electric power is supplied via both the current-conversion-device line and the bypass line is provided for the line switching operation. This makes it possible to allow a current during the line switching operation to be changed along the current gap in a gradual or stepwise manner so as to further effectively reduce the risk of occurrence of torque shock.

This application is based on Japanese Patent Application Serial No. 2006-229373, filed with Japan Patent Office on Aug. 25, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control system for a hybrid vehicle, said hybrid vehicle including a generator adapted to be driven by an internal combustion engine and a vehicle-driving motor adapted to drive road wheels, and having a specific electric-power supply mode for supplying an alternating current generated by said generator, to said vehicle-driving motor without AC-to-DC-to-AC conversion, said control system comprising:

a current conversion device interposed in a current-conversion-device line electrically connecting said generator and said vehicle-driving motor, and adapted to be operated based on an electric power supplied from a battery so as to change an amplitude or a frequency of an alternating current generated by said generator;

required motor output determination unit adapted to determine a required output of said vehicle-driving motor in conformity to a required vehicle-driving force;

electric-power supply control unit adapted to determine a current waveform of an AC electric power to be supplied to said vehicle-driving motor, in conformity to said required output of said vehicle-driving motor, and controllably determine a strategy of how to supply said AC electric power; and a bypass line adapted to electrically connect said generator and said vehicle-driving motor in such a manner as to bypass said current conversion device, wherein said electric-power supply control unit is operable, when there is a substantial waveform difference between a current waveform required for said vehicle-driving motor and a current waveform output from said generator, in said specific electric-power supply mode, to supply an AC electric power from said generator to said vehicle-driving motor via said current-conversion-device line so as to eliminate said waveform difference through said current conversion device, and, when there is no substantial waveform difference between said current waveforms and thereby an equilibrium waveform conversion is performed in said current conversion device, in said specific electric-power supply mode, to supply an AC electric power from said generator to said vehicle-driving motor via said bypass line without mediation of said current conversion device.

2. The control system as defined in claim 1, further comprising:

required generator output determination unit adapted to determine a required output of said generator in conformity to said required output of said vehicle-driving motor; and required engine output determination unit adapted to determine a required output of said engine in conformity to said required output of said generator.

3. The control system as defined in claim 1, wherein said electric-power supply control unit is operable to switch from said current-conversion-device line to said bypass line, at a predetermined switching timing around a zero-cross point of a current waveform output from said generator or said current converter device.

4. The control system as defined in claim 1, wherein said electric-power supply control unit is operable to switch from said current-conversion-device line to said bypass line, after an elapse of a predetermined transitional time period during which the AC electric power is supplied via both said current-conversion-device line and said bypass line.

* * * * *